Dec. 15, 1931.  C. THOMPSON  1,836,203
MECHANICAL ANIMAL
Filed June 30, 1930   5 Sheets-Sheet 1

Charles Thompson
INVENTOR
BY Victor J. Evans
ATTORNEY

Dec. 15, 1931. C. THOMPSON 1,836,203
MECHANICAL ANIMAL
Filed June 30, 1930 5 Sheets-Sheet 2
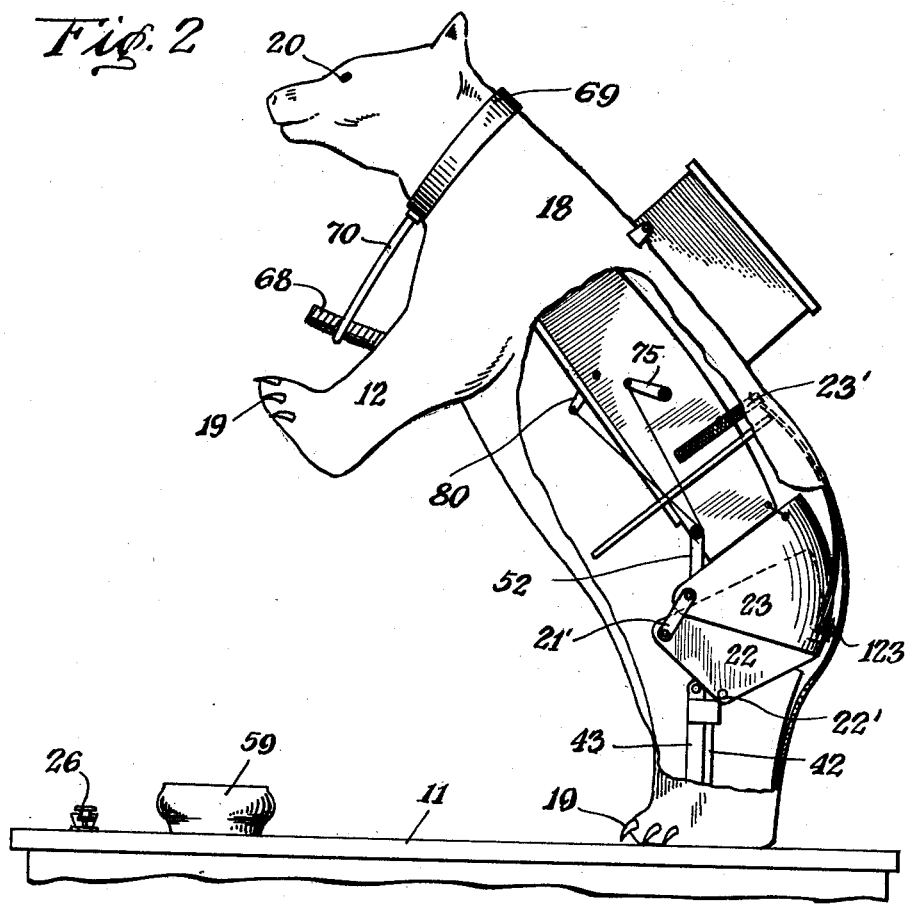
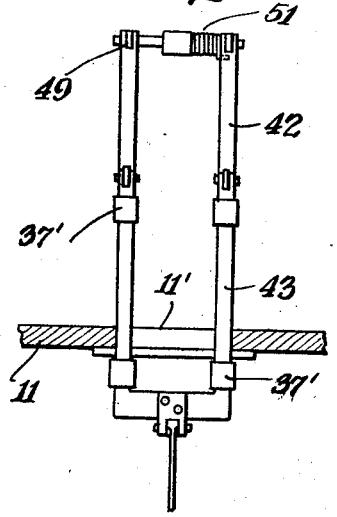
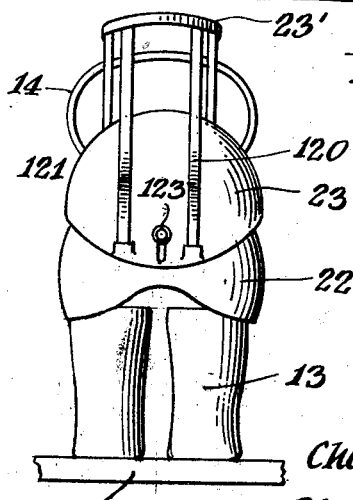

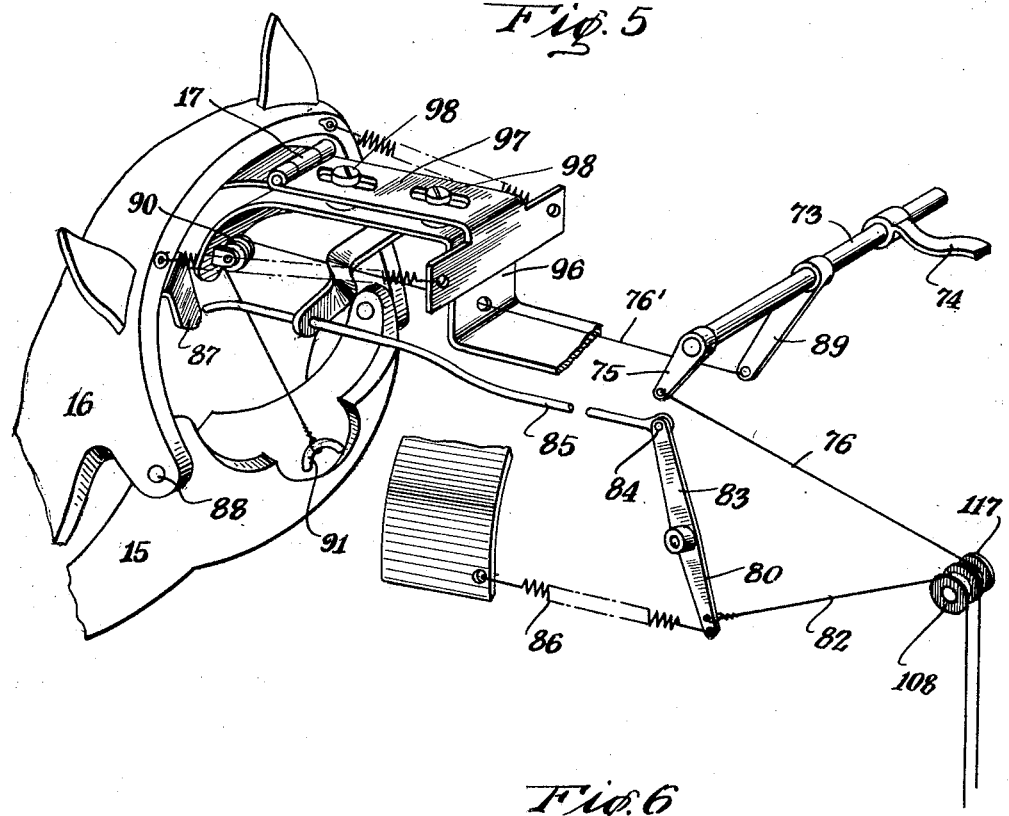
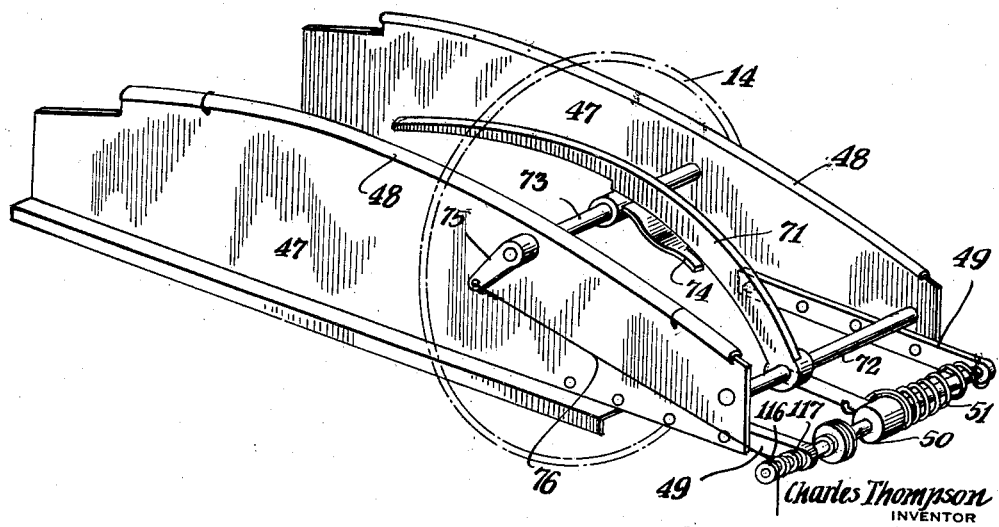

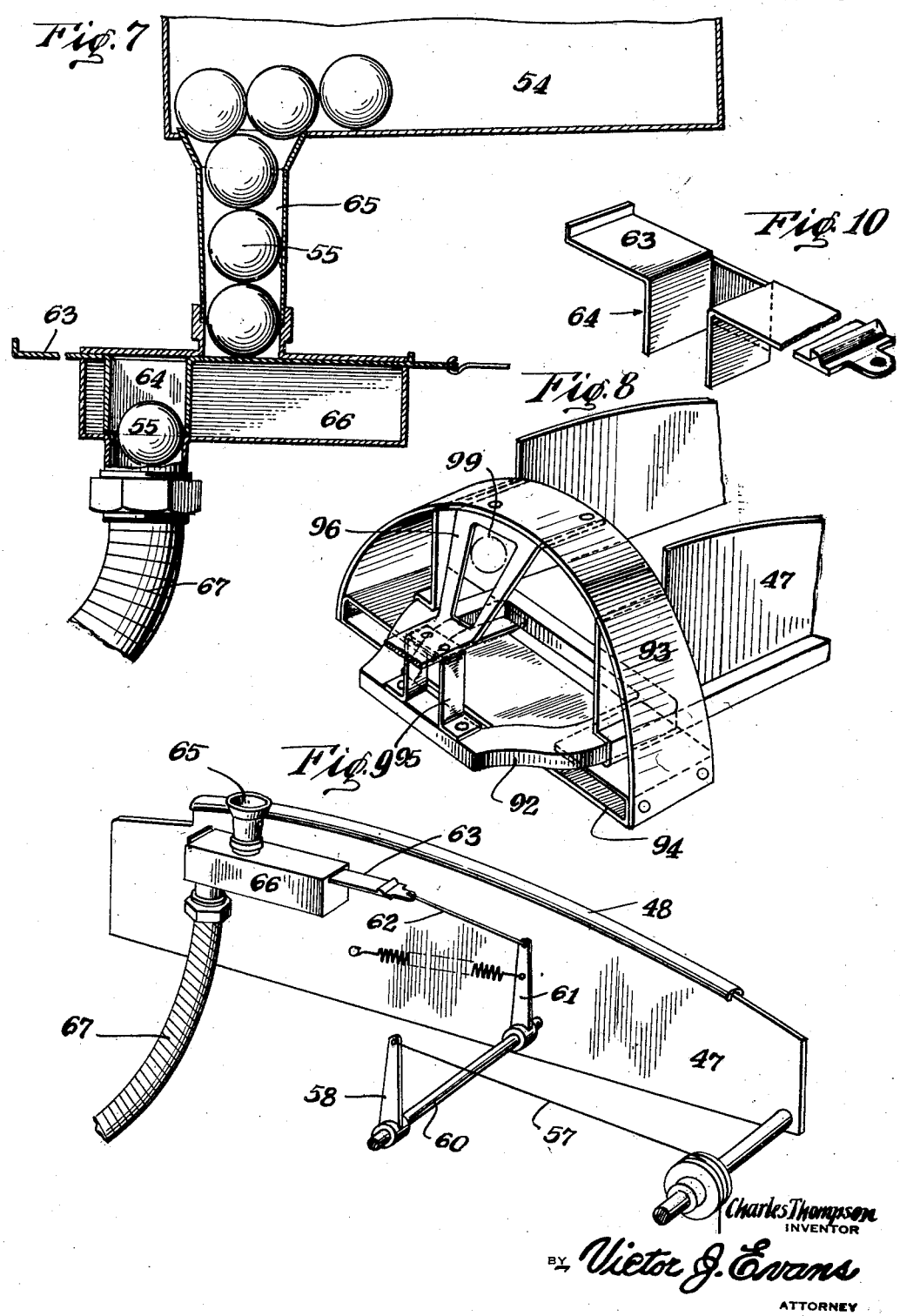

Dec. 15, 1931.  C. THOMPSON  1,836,203
MECHANICAL ANIMAL
Filed June 30, 1930  5 Sheets-Sheet 5
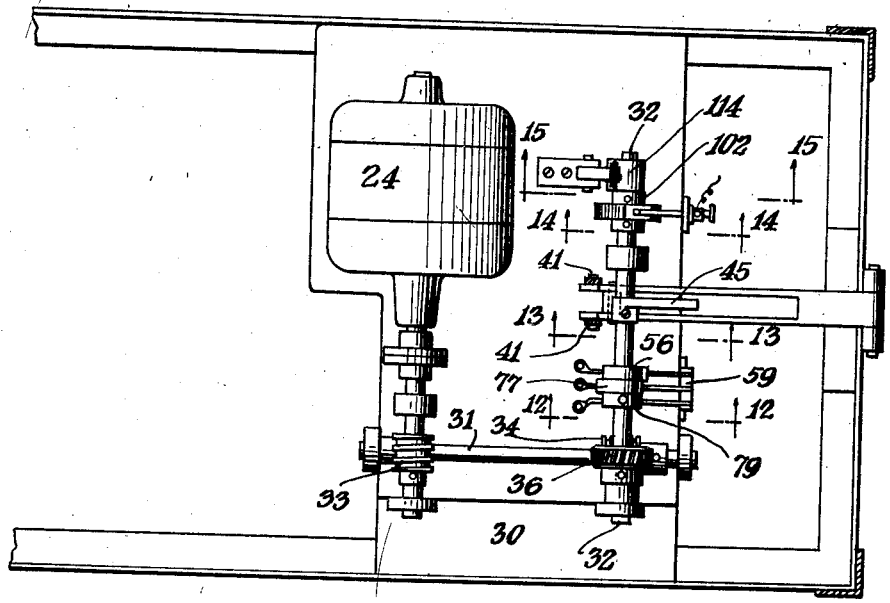
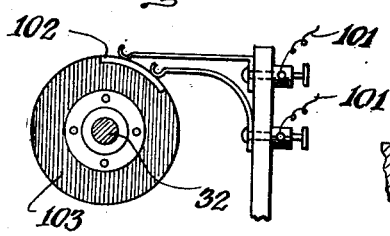
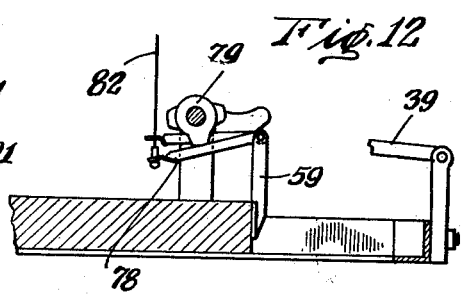
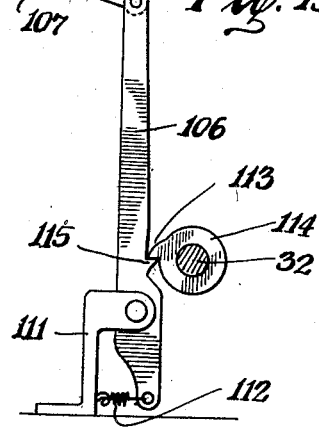
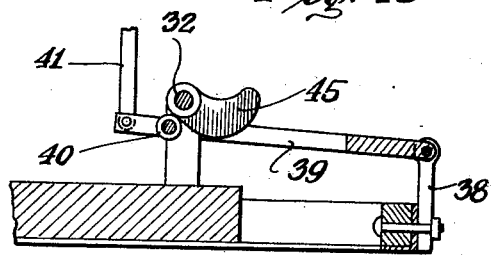
Charles Thompson
INVENTOR
BY Victor J. Evans
ATTORNEY Patented Dec. 15, 1931

1,836,203

UNITED STATES PATENT OFFICE

CHARLES THOMPSON, OF NEW YORK, N. Y.

MECHANICAL ANIMAL

Application filed June 30, 1930. Serial No. 464,973.

This invention relates to mechanical devices which simulate animals and has particular reference to mechanical bears.

One of the objects of the invention is the provision of a mechanical animal which, being placed in a populous surrounding, such as a store or place in which saleable articles are being displayed, may be caused to temporarily perform conspicuous rearing or rampant movements, so as to invite the attention even of people who are located at some distance.

As the animal descends from the rampant position and then continues not only to move, at least briefly, but also to emit audible sounds, like a growling bear, the result then is that those whose attention has been arrested are attracted to the articles on display, the latter being in the vicinity of the apparently animated mechanism, which suddenly discontinues the performance, this being to secure another object of the invention.

While in my prior application, serially numbered 195,685, a bear is disclosed which performs movements like those just referred to, and also additional subsequent performances, a further object of this invention is to curtail the action of the animal, so that instead of watching continued mechanical operations, persons attracted by the initial movements may have an opportunity to observe the articles on display.

Therefore, a still further object of the invention, connected with the foregoing, is the provision of an organization in which the constituent elements are so coordinated structurally and functionally as to insure improved results with materially reduced structure.

As the animal, which is electrically operated, carries a quantity of articles or nuggets, which may be of the candy type, and even freely dispenses one of the articles after each rampant movement, this being responsive to placing actuating means, such as a slug or metal disc, in part of the mechanism, a still further object of the invention, with a view to further attracting attention to the display, is to occasionally place a valuable or gold nugget with those to be freely dispensed. The nuggets are procurable by the persons utilizing the actuating means, which also include a push button.

Other objects and advantages of the invention will be hereinafter specifically pointed out, or will become apparent, as the specification proceeds.

With the above indicated objects in view, the invention resides in certain novel constructions and combinations and arrangement of parts, clearly described in the following specification and fully illustrated in the accompanying drawings, which latter show embodiments of the invention as at present preferred.

In said drawings:

Fig. 2 is a fragmentary elevational view in which a bear is shown in a rearing or elevated position.

Fig. 3 is an elevational view of a frame.

Fig. 4 is a partial elevational view of the structure shown in Fig. 2.

Fig. 5 is a perspective detail view.

Fig. 6 is also a perspective detail view.

Fig. 7 is a fragmentary sectional detail view of a dispensing device.

Fig. 8 is a fragmentary perspective of the inner frame structure.

Fig. 9 is a perspective showing operating mechanism for the dispensing device.

Fig. 10 is a perspective of a dispensing slide per se.

Fig. 11 is a horizontal sectional view taken on the line 11—11 of Fig. 1.

Fig. 12 is a section on the line 12—12 of Fig. 11.

Fig. 13 is a section on the line 13—13 of Fig. 11; and

Fig. 14 is a section on the line 14—14 of Fig. 11.

Fig. 15 is a section on the line 15—15 of Fig. 11.

Figure 1:
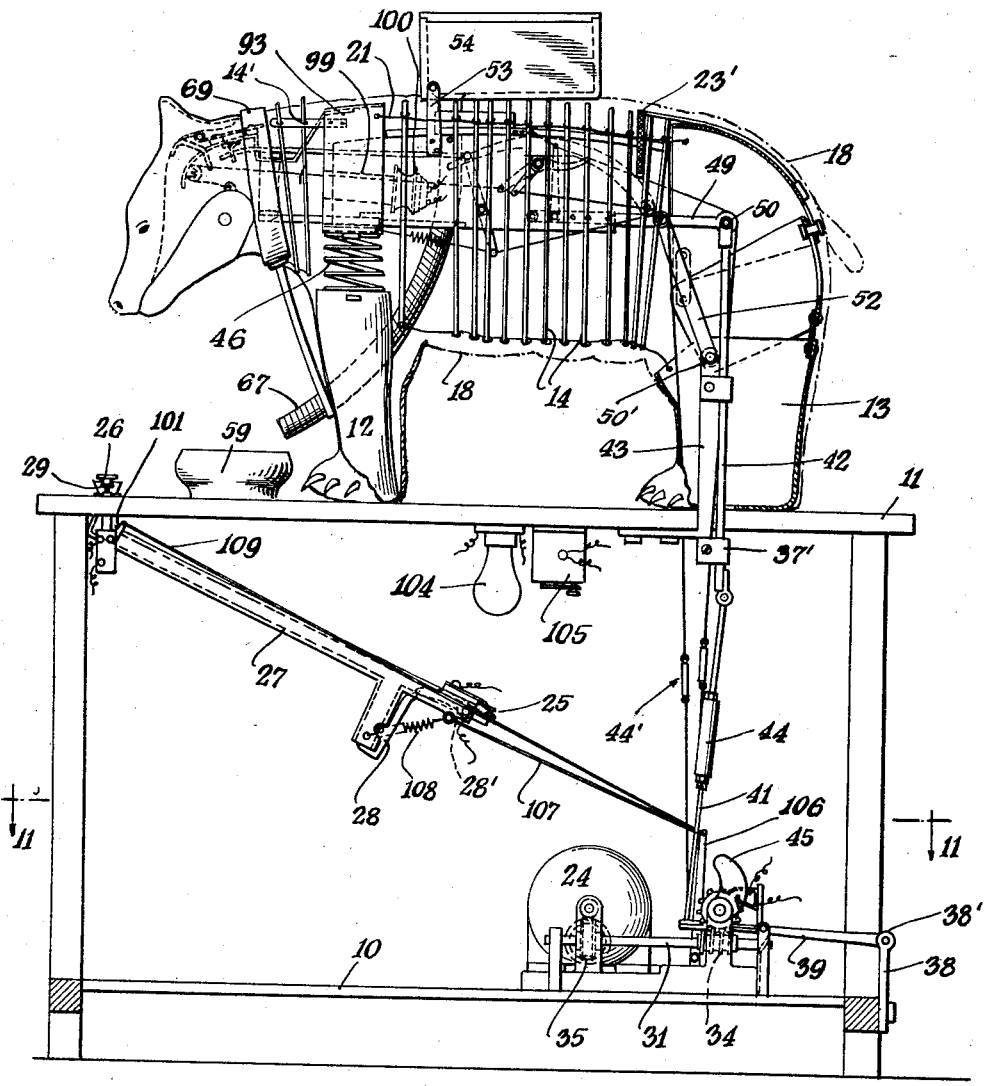
Fig. 1 is a skeleton view of my improved mechanical animal.

Referring particularly to the drawings by reference characters, the numeral 10 represents the base of a stand or table, on the top 11 of which, supported on tubular front legs 12 and rear legs 13, the animal stands, with all four feet on the said top or support, in a normal or horizontal position. While these legs, in order to accommodate operating mechanism, and to render the structure light and easy to move, are hollow, the body of the animal, which includes wire ribs 14, is also hollow; and while the head, which has a pair of jaws 15, 16, is hinged to the body at 17, the internal structure is neatly enveloped by a removable mohair or hairy fabric cover or pelt 18, which renders the mechanical animal very realistic, other features being claws 19, and eyes 20.

While the ribs 14, which are spaced apart for limit fore and aft movement, as by flexible means 21, are also limitedly movable transversely, the inner or skeleton body framework includes a pair of hind shields 22, 23, so that when the animal rears or assumes a rampant position, as shall hereinafter appear, the pelt and part of the central body framework, which form an outer shell, sag slightly, as is natural with animals of this class. The shield 22 is pivoted at 22', and the shield 23, which is resiliently connected with the body structure at 23', is also yieldably connected with the shield 22 by a link as at 21'.

The mechanism is operated by an electric motor 24, in the circuit of which is a pair of normally spaced contacts 25. On inserting a disk or slug in a receiver 26, for descent through a chute 27, to strike a pivoted trigger 28, the said trigger releases a spring actuated tongue 28' which closes the circuit at 25, to start the motor. Also in the wiring is a switch 29, which may be used to close the circuit instead of the disc.

Carried on the base 10 is a base plate 30 on which, as well as the motor 24, bearings are mounted for the motor shaft and for additional shafts 31, 32. While the motor shaft carries a worm 33, and the shaft 31 a worm 34, the said shaft 31 also carries a worm gear 35, which meshes with the worm of the motor shaft; and the shaft 32 a gear 36, which meshes with the worm 34 of the shaft 31, so that, each shaft being in turn geared down, revolution of the shaft 32 is comparatively slow.

Attached to part of the base 10 is a bracket 38 which has, pivoted thereon at 38', a forked arm 39. This arm carries a roller 40 and, at its inner end, a pair of links 41 which, attached to adjustable linkage below a slidable frame 42, is effective, on movement of the forked arm, to slide said frame 42 in a fixed frame generally designated 43, the latter being carried on the support 11. While the support has therein an opening 11', the frame 43 is provided with keepers, as at 37, 37'. Said adjustable linkage includes a turnbuckle member 44.

On revolution of the shaft 32 a large lobed cam 45, rigid with said shaft, is effective, owing to contact with the roller 40, to depress the arm 39. While body of the animal rises, by reason of a frame 42, which is slidable in the keepers, during depression of said arm, just as the tip of the cam passes the roller the said body descends to the horizontal position. Springs, as at 46, disposed within the legs 12, absorb weight as the said legs reach the table or support.

A pair of frame members 47, upwardly curved at their top edges, and having on the latter resilient or rubber coverings 48, form an internal rigid structure or frame, and as the ribs 14 are supported on these coverings and limitedly movable upwardly therefrom, the said ribs, one of which is however rigid with the inner frame structure, as at 14', impart a very natural appearance to the body of the animal, when the pelt, which is adjustable as by fastening elements, not shown, is fastened over the ribs. Bars 49 extend from the members 47, and while a pivot rod 50 is carried by these bars the terminals of the frame 42 are also pivoted on the said rod. A torsion spring 51 partly takes the weight of the body during movement. Like links 52, one on each side, are terminally pivoted on the bars 49 and on the rod 50'.

Carried on a pair of ears 53 is a container 54 in which nuggets 55 or articles to be dispensed are placed. A cam 56, rigid with the shaft 32 is effective to depress one of three levers, as the body rises, to pull a cable 57 or wire which, attached to an arm 58, is also attached to the said lever. While the three levers are pivoted on a bracket 59, the said arm is rigid with a turnable rod 60, on which is also a spring controlled arm 61, and as the latter arm is attached by a wire 62 to a slidable trough 63 a recess 64 is aligned with a tube 65 of the container 54, so that an article 55, dropped into the said recess, is also then positioned in a housing 66. As the body descends the cam 56 releases the lever and its cable 57 to align the recess with a dispensing tube 67, as seen in Fig. 7. Therefore, the nugget is delivered into a tray 68, or the like, as the body descends. This tube 67 is held in the required position on the animal by a collar 69 and strap 70.

For urging the ribs 14 upwardly, to hump the back of the animal, after the article drops into the tray 59, this being to denote anger or to protect the article, as well as to cause amusement, a curved arm 71, which is rigid with a turnable rod 72, is carried within the body. This arm rests on another turnable rod 73, on which is an arm 74. Attached at one of its ends in another arm 75, the latter being rigid with the rod 73, is a cable or wire 76, the opposite end of which is attached to a second one of the three levers which are pivoted on the bracket 59 of the base 30; and as another cam 77 is fixedly carried on the shaft 32, to depress the last mentioned lever, the result is that, the rod 73 being turned, the arm 74 urges the curved arm 71 upwardly for moving the outer shell of the body, as above described. As the projection of the cam 77 passes the lever the arm 71 of course drops.

A third lever 78, also pivoted on the bracket 59, is depressed, during revolution of the shaft 32, by a third cam wheel or disc 79, there being also a projection on the latter. Terminally attached to the lever 78 and to one arm 80 of a lever, which is pivoted at 81, is another cable 82. Since the other arm 83 of this latter lever has pivoted thereon at 84 a push rod 85, movement of the cable 82, responsive to depression of the lever 78, urges the said rod longitudinally, against the action of a spring 86. The end of this rod then contacts with a plate 87 to rock the hinged head of the animal.

While the head is rockable, the lower jaw 15, which is pivoted at 88, is movable relative to the upper jaw to perform a biting operation, this latter operation being performed during turning movement of the rod 73, since the latter has thereon an arm 89, to which is attached a cable 76'. This cable passing over a sheave 90, which is carried on the inner rigid frame structure, and is terminally attached to the lower jaw at 91.

Said inner frame structure includes, in attachment with the member 47, a yoke 92 and a saddle 93, which latter while carrying the forward end of the flexible member 21, secures at its base 94 the top ends of the springs 46. While the yoke 92 carries a bridge piece 95, the latter has attached thereto, and also to the saddle 93, a plate 96, and as this plate is slotted and coacts with a slotted plate 97, as seen in Fig. 5, the head of the animal is longitudinally adjustable, since screws 98 or the like engage in the slots to said plate 97 in a selected position, relative to the plate 96. The forward terminal of the plate 97 forms part of the hinge 17.

An electrically operated horn 100, being mounted on the rear part of the yoke 92, is carried by the inner frame structure, and as this horn has in the orifice thereof a piece of flexible tubing 99, which may be indented or bent as desired, the growls or sound of the horn may be changed. In order to properly time the sounding of the horn, which, by wiring 101, is connected in parallel with the circuit wiring of the motor 24, said wiring 101 has therein a make and break conductor 102. This conductor is carried on a disc of insulating material 103 which is attached to and revolvable with the shaft 32, also in the circuit, in parallel with the horn is a lamp or lamps, as at 104, and a rheostat 105.

Preferably, the shaft just mentioned turns in the direction indicated in Fig. 13, so that the convex edge of the cam 45 rather slowly depresses the arm 39 to raise the body of the animal accordingly; then the body, by reason of the opposite straight or rather concave edge of the said cam, drops or descends quickly as is usual with animals of the bear type.

On completion of a cycle of operations by the animal the circuit is broken at 55, since there is on the base 30 an arm 106, which carries a rod 107 for moving the tongue 28', against the action of a spring 108, to open the circuit. A rod 109 may be used in connection with the switch 29 for opening or closing the circuit at 110, said latter rod being also carried on the arm 106. This arm is pivoted on a bracket 111 and is spring tensioned at 112, so that a tooth 113 of a disc 114 on the shaft 32 is effective to contact with a tooth 115, on the said rod 106, to urge the latter against the action of the spring 112. The rod 106 is shown, just after completion of a cycle of movement, in Fig. 15.

While rollers 116, 117 are provided on a pin 118, carried on a bar 49, to facilitate movement of the cables 76 and 82, a roller 119 for the cable 57 is carried on the rod 50; and while these cables are movably positioned in the opening 11' of the base 11, turnbuckles are provided, as at 44' for adjusting purposes.

The shield 23 is movable relative to the shield 22, by reason of the links 21', and movement of said shield 23 is further controlled by strips 120, 121, which, attached to the resilient strip 23', are also attached at their opposite ends to said latter shield. Mutual movement of these shields, which are slotted, as at 122, is also controlled by a cooperating pin 123.

The hereinbefore described construction admits of considerable modification without departing from the invention; therefore, I do not wish to be limited to the precise arrangements shown and described, which are as aforesaid, by way of illustration merely. In other words, the scope of protection contemplated is to be taken solely from the appended claims, interpreted as broadly as is consistent with the prior art.

What is claimed as new is:

1. In a mechanical animal comprising in combination with a support and a base, said support having an opening therein, hollow rear legs rigid with said support and communicating with said opening, an angularly adjustable hollow body, flexible means connecting the latter with said legs, a frame disposed within said body and partly attached to said body, said frame being movable with said body, pivot means carried by said frame adjacent said hollow legs, a second frame movably disposed in said opening and in said hollow legs, said second frame pivoted on said second means, an actuating arm carried on said base, linkage connecting said arm and said second frame, a revolvable shaft, and a cam rigid with said shaft for actuating said arm, whereby on revolution of said shaft said second frame is effective to move said first frame for lifting said body.

2. In a mechanical animal comprising in combination with a support and a base, said support having an opening therein, hollow rear legs carried on said support and communicating with said opening, an angularly adjustable hollow body, yieldable means connecting said body with said legs, a frame disposed within said body and partly attached to said body, said frame being movable with said body, pivot means carried by said frame adjacent said hollow legs, a second frame movably disposed in said opening and in said hollow legs, said second frame pivoted on said second means, an actuating arm carried on said base, a roller mounted on said arm, linkage connecting said arm and said second frame, a revolvable shaft, and a cam rigid with said shaft and movably contacting with said roller for actuating said arm, whereby on revolution of said shaft said second frame is effective to move said first frame for lifting said body.

3. In a mechanical animal comprising in combination with a support and a base, said support having an aperture therein, hollow rear legs resting on said support and communicating with said opening, an angularly adjustable hollow body, yieldable means connecting said body with said legs, a frame disposed within said body and partly attached to said body, said frame being movable with said body, pivot means carried by said frame adjacent said hollow legs, a second frame movably disposed in said opening and in said hollow legs, said second frame pivoted on said second means, a bracket carried by said base, an actuating arm movably mounted on said bracket, a roller carried by said arm, linkage connecting said arm and said second frame, a revolvable shaft, and a cam rigid with said shaft and movably contacting with said roller for actuating said arm, whereby on revolution of said shaft said second frame is effective to move said first frame for lifting or depressing said body.

4. In a mechanical animal comprising in combination with a support and a base, said animal including a hollow body, which latter has therein a rigid frame, and said support having an opening therein, a rockable head having internally thereof a plate, hinge means connecting said head and said frame, a lever pivoted on said frame, a push rod pivoted at one of its ends on one arm of said lever and having its other end disposed adjacent said plate, spring means carried by the other arm of said lever and normally retaining the second end of said rod in spaced relation with said plate, rollers mounted within said hollow body, a revolvable shaft carried on said base, a depressible lever pivoted on said base, flexible means terminally attached at one of its ends to said first lever adjacent said spring means, said flexible means passing over said rollers and through said opening and having it other end attached to said second lever, and a cam rigid with said shaft for depressing said second lever, whereby on revolution of said shaft said flexible means is effective to move said first lever on its pivot, against the action of said spring means, to urge said rod into contact with said plate for rocking said head.

In testimony whereof I hereby affix my signature.

CHARLES THOMPSON.